United States Patent [19]

Fleming

[11] Patent Number: 4,655,388
[45] Date of Patent: Apr. 7, 1987

[54] DISKETTE FOLDER WITH STRAP FASTENER

[75] Inventor: James D. Fleming, Chesterfield, Mo.

[73] Assignee: Central States Products Company, St. Louis, Mo.

[21] Appl. No.: 835,734

[22] Filed: Mar. 3, 1986

[51] Int. Cl.$^4$ .............................................. B65D 27/22
[52] U.S. Cl. ................................. 229/45 R; 206/444; 206/474; 229/40; 229/77; 229/84
[58] Field of Search ............... 206/444, 474, 424, 472; 229/45 R, 77, 40, 84, 76, 87 R, 68 R, 82

[56] References Cited

U.S. PATENT DOCUMENTS

| | | | |
|---|---|---|---|
| 1,615,200 | 1/1927 | Shrum | 229/40 |
| 1,765,964 | 6/1930 | Berton | 229/45 R |
| 1,776,628 | 9/1930 | Kinkenon | 229/45 R |
| 1,984,371 | 12/1934 | Hazard et al. | 229/45 R |
| 2,028,677 | 1/1936 | Lupton | 229/45 R |
| 2,028,678 | 1/1936 | Lupton | 229/45 R |
| 2,973,129 | 2/1961 | Stone et al. | 229/40 |
| 3,013,711 | 12/1961 | Kronson et al. | 229/45 R |
| 3,519,127 | 7/1970 | Wood | 229/40 |
| 3,570,746 | 3/1971 | Wood | 229/40 |
| 3,640,448 | 2/1972 | Wood | 229/40 |

Primary Examiner—William Price
Assistant Examiner—Bryon Gehman
Attorney, Agent, or Firm—Edward R. Weber

[57] ABSTRACT

A diskette folder cut from a single piece of resilient, flexible material, such as leather, polyethylene, polypropylene, polyvinylchloride, and the like, and having a front and back panel, two spines or backings, a retaining flap, integral straps spaced at regular intervals, apertures on the front panel and retaining flap spaced correlatively to the straps, and transverse slits on the front panel to secure the strap ends; said folder having the capability of holding a plurality of diskette envelopes which, in one embodiment, have apertures corresponding to the straps at two locations and are formed of the same material as the folder.

5 Claims, 6 Drawing Figures

DISKETTE FOLDER WITH STRAP FASTENER

FIELD OF THE INVENTION

The present invention relates to one-piece folders, and more particularly, to computer software folders manufactured from a single piece of material and capable of holding diskettes securely, protected from external objects and occurences which could be detrimental to their use and which are easily transportable and provide a convenient method of diskette storage.

BACKGROUND OF THE INVENTION

In the past diskette storage has been addressed by conventional means, such as trays, library cases, plastic looseleaf protectors held in metal ring binders, rotary files, cases which can be stored in desks, and the like. Unfortunately software users have discovered drawbacks to most of these means.

In the case of trays, although they are convenient to use and offer protection from dust, etc. when covered, if they are accidentally turned over, the tray may break and the diskettes scatter everywhere, exposing them to external objects and conditions which can render them unusable. Too, they can be inconvenient to use if the diskettes must be transported, since they rarely have locks and are usually cumbersome to carry. Library cases address the problem of transportation, but snap open, possibly spilling the contents, and can be broken when dropped. They also take up a lot of space for storage depending on how they are organized for filing, especially when they are not full. Plastic looseleaf protectors are prone to tearing with constant use and may expose the diskettes to the metal rings if the diskettes are handled carelessly. They too present storage problems when held in conventional binders due to the width of the back panel. Rotary diskette files also present storage and transportation problems since they take up too much space and are difficult to carry. Also if dropped, the diskettes may scatter, again exposing them to external objects and conditions which may be detrimental to them. Cases which may be stored in a desk drawer solve some problems with storage, but are cumbersome to carry and are uncovered, exposing them to a potentially harmful environment if dropped or tipped over. Additionally, many of the conventional means are produced through multiple steps and therefore are mcre expensive to manufacture than the present invention.

It is therefore among the objects of this invention to provide a one-piece, inexpensive storage folder for diskettes which will protect them from external objects, will prevent them from scattering if dropped, is easily transportable, and is easily stored anywhere with a minimum of space requirements.

SUMMARY OF THE INVENTION

The present invention is cut from a single piece of resilient, flexible material and scored and folded to have a front and back panel, two spines or backings, and a retaining flap. Retaining members in the form of straps are cut from the back panel in such manner that they remain integrally connected to the back panel at one end. These straps are shaped such that there exists a protuberance on each strap. The protuberances are located on the length of the strap at a point which is nearer the root of the strap than the free end of the strap. The portion of the strap from the protuberance to the free end creates a tongue, the use of which will become apparent from this description. These straps are spaced at regular intervals. Apertures are regularly spaced on the retaining flap through which the integral straps may be threaded. Additional apertures, widely slotted from the edge of the front panel, are spaced to correspond with the apertures on the retaining flap. The straps may be threaded through the front panel at the widely slotted apertures and the tongues of the straps may then be secured in transverse slots cut in the front panel. The front and back panels are sized so that one dimension slightly exceeds the height of a diskette storage envelope. The spines or backings are sized to accept a plurality of diskette envelopes to provide a compact folder for same.

In use, a diskette envelope would have two apertures in the bottom of the envelope to correspond with two adjacent straps and apertures of the folder. A plurality of these envelopes would be laid in the folder and two of a plurality of the straps would be threaded through each envelope, the protuberances of the straps being pulled through the apertures to create a book-like folder. The plurality of straps may then be pulled through the retaining flap at corresponding apertures and through the slotted apertures of the front panel, the protuberances holding the diskettes and folder securely with the tongue of the strap then being tucked into transverse slots.

The folder may have many embodiments. One possible embodiment is a folder having only two straps and corresponding apertures, such that a plurality of diskettes are aligned one above the other and securely held when the straps are threaded through the envelopes, the retaining flap, and the front panel, the tongues of the straps then tucked into the transverse slots. Another possible embodiment is a folder having a plurality of straps and corresponding apertures, such that a plurality of diskettes are held securely by two adjacent straps, but are staggered along the length of the folder.

As will be readily apparent, the present invention will provide software users with a compact, inexpensive, enclosed folder which will hold the diskettes securely, will protect the diskettes from external objects and environmental conditions which may be detrimental to them, will be easily transportable, and will be convenient for storage.

DETAILED DESCRIPTION OF THE INVENTION

Figure 1:
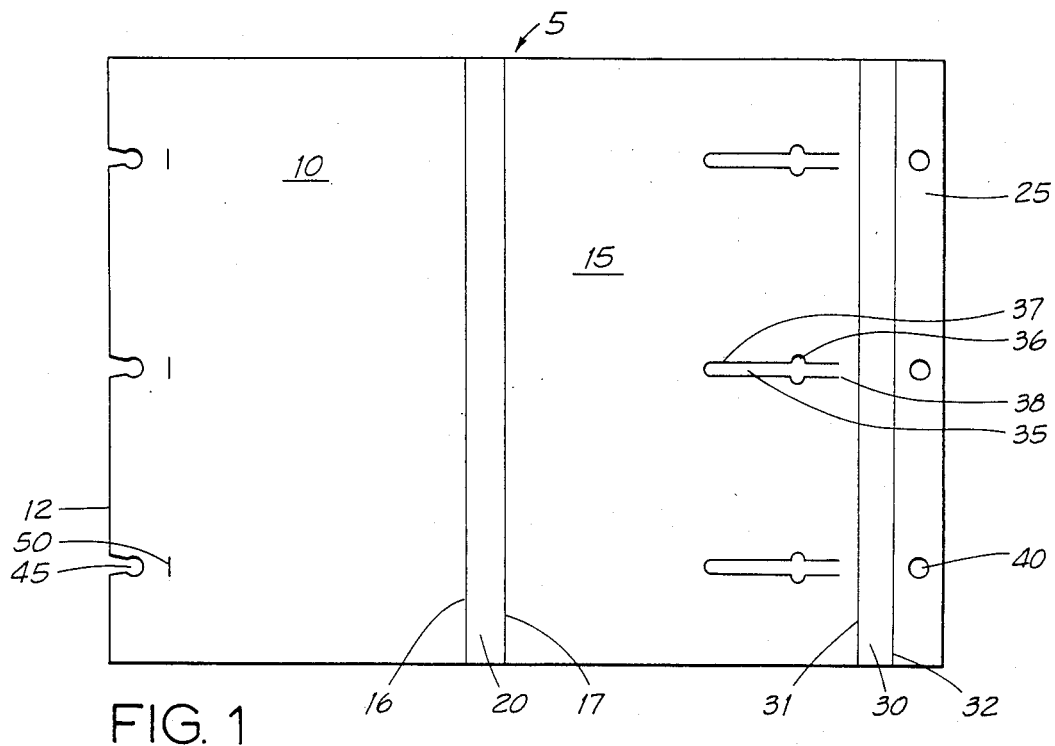
FIG. 1 is a plan view of the diskette folder of the present invention.

Referring now to the drawings wherein like reference characters represent like elements, FIG. 1 shows the diskette folder 5 cut from a single sheet of resilient, flexible material, such as leather, polyethylene, polypropylene, polyvinylchloride, and the like, creased or scored at fold lines 16 and 17 to form front panel 10 and back panel 15, hingedly extending from spine 20, and creased or scored at fold lines 31 and 32 to form back panel 15 and retaining flap 25, hingedly extending from spine 30.

The sheet material is punched or stamped out to provide elongated straps 35 extending outwardly from fold line 31 such that roots 38 of straps 35 lie uniformly adjacent to fold line 31. Each strap 35 is comprised of root 38, protuberance 36, and tongue 37. Retaining flap 25 is punched or stamped out such that apertures 40 are in aligned relation with straps 35. Front panel 10 is cut such that widely slotted apertures 45 extend transversely from and communicate with edge 12 of front panel 10 and are in aligned relation with straps 35 and apertures 40. Transverse slots 50 are cut in front panel 10 in aligned relation to widely slotted apertures 45 and running parallel to fold line 16.

Figure 2:
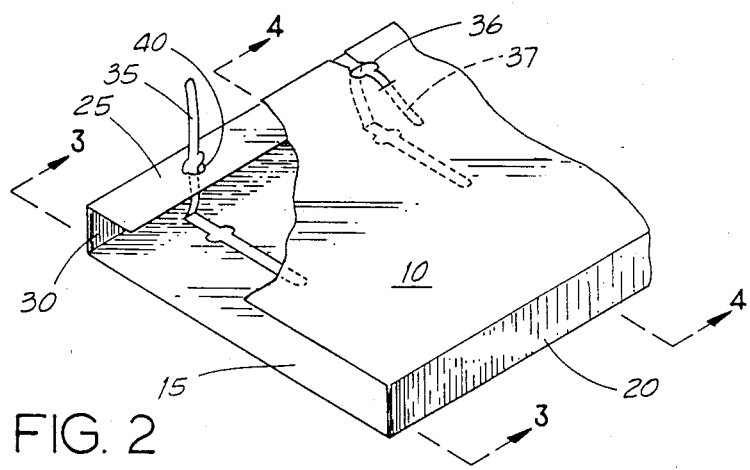
FIG. 2 is a fragmentary view showing one strap being lifted from the back panel and pulled through the retaining flap and one strap pulled through the retaining flap and front panel with the protuberance of the strap locking against the front panel and the tongue of the strap tucked into the traverse slot.

FIG. 2 illustrates the manner in which straps 35 are utilized to securely hold the diskette envelopes in the diskette folder. This fragmentary view illustrates that straps 35 are lifted up from back panel 15 and manipulated in curvilinear fashion and pulled through apertures 40 in retaining flap 25, protuberances 36 holding retaining flap 25 in such manner that spine 30 will lock against and retain inside any diskette envelope which may be in the folder. Straps 35 are then pulled through widely slotted apertures 45 in front panel 10, such that protuberances 36 fasten the entire folder 5 in a rectangular configuration, enclosing any diskette envelope which may be in folder 5. Tongues 37 of straps 35 are then tucked into transverse slots 50 forming a completely secured folder.

Figure 3:
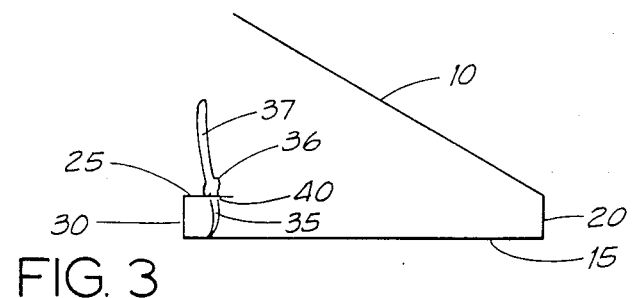
FIG. 3 is a section view along line 3—3 of FIG. 2 showing the strap threaded through the retaining flap, the protuberance locking the flap in place.

In FIG. 3, one elongated strap 35 is shown lifted up from back panel 15, manipulated in a curvilinear fashion, and pulled through aperture 40 in retaining flap 25. Protuberance 36 fastens retaining flap 25 in such manner that retaining flap 25 is approximately parallel to back panel 15, fashioning an enclosed end in which to hold a diskette envelope.

Figure 4:
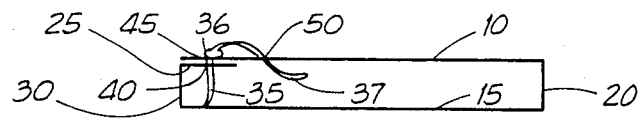
FIG. 4 is a section view along line 4—4 of FIG. 2 showing the strap threaded through the retaining flap and front panel with the protuberance holding the flap and panel in place and the tongue tucked into the traverse slot.

FIG. 4 completes the steps commenced in FIG. 3. Tongue 37 and protuberance 36 of strap 35 are pulled through widely slotted apertures 45 in front panel 10, fastening front panel 10 in such manner that spine 20 is approximately parallel to spine 30 and front panel 10 is approximately parallel to back panel 15 thereby completing an enclosing folder for diskette envelopes. Tongue 37 is then tucked into transverse slot 50 in front panel 10 to securely fasten the folder, the loose end laying against the inside of front panel 10 to avoid any inadvertent snagging of the loose end.

Figure 5:
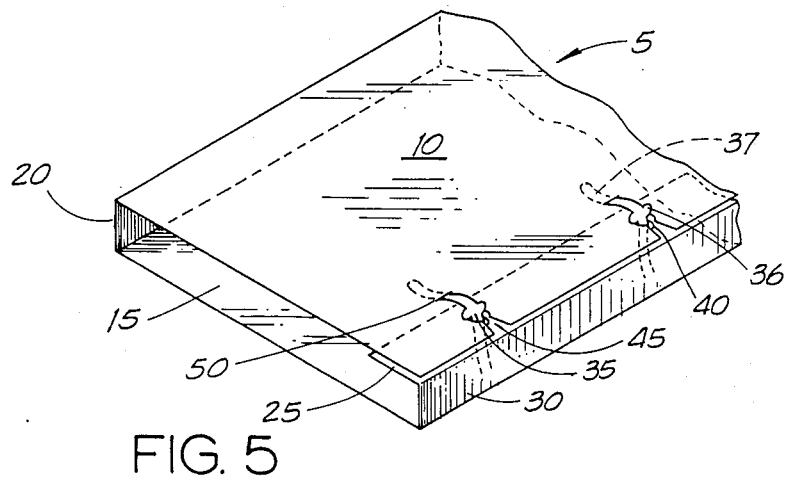
FIG. 5 is a partial view from the top showing the folder closed with the straps pulled through the retaining flap and front panel, the protuberances holding same together and the tongues of the straps tucked into the traverse slots.

FIG. 5 shows two of a plurality of straps 35 being lifted up from back panel 15, manipulated in a curvilinear fashion, and pulled through apertures 40 of retaining flap 25 and widely slotted apertures 45 of front panel 10, protuberances 36 fastening folder 5 in a trapezoidal configuration thereby enclosing any diskette envelopes which may be inside. Tongues 37 are then tucked into transverse slots 50, securing the tongues within folder 5 and preventing inadvertent snagging or loosening of any part of folder 5.

Figure 6:
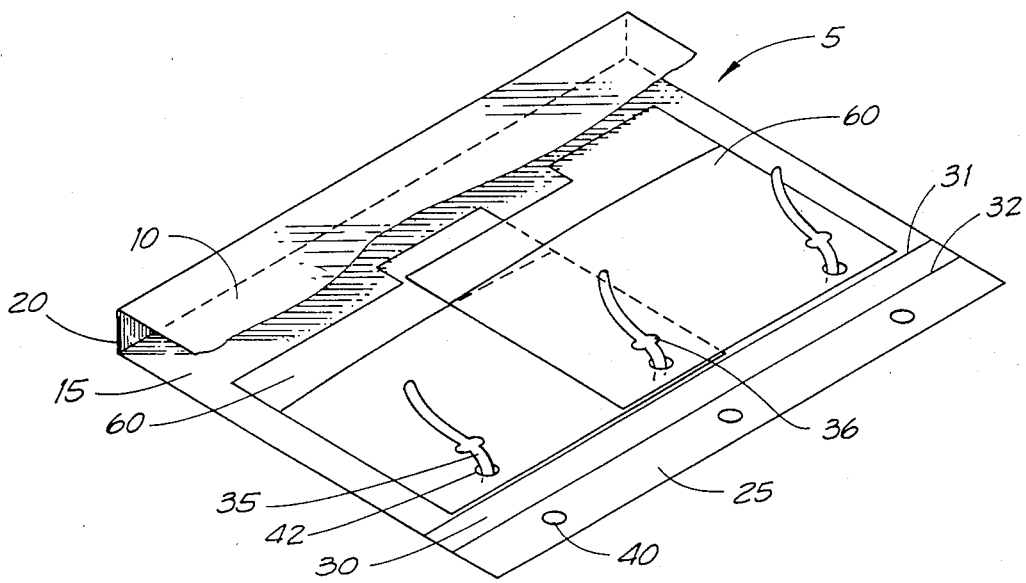
FIG. 6 is a top view showing two diskette envelopes laid in staggered alignment in the folder, adjacent straps being pulled through the two apertures in the bottom of the envelopes with the protuberances holding the diskette envelopes in place, and the retaining flap extended.

FIG. 6 is a top view showing diskette envelopes 60 in staggered alignment within folder 5, elongated straps 35 having been pulled through apertures 42 in envelopes 60 thereby initially securing the envelopes within the folder.

From the foregoing description, it will be readily understood that diskette envelopes are laid within the folder and secured by straps which are threaded through the envelopes themselves, a retaining flap which encloses the portion of the folder adjacent to the bottom edge of the envelopes, and a top panel which encloses the portion of the folder adjacent to the top edge of the envelopes. When the tongues of the straps are then secured within the folder as well, the diskette envelopes and their contents are securely held in a folder which prevents them from scattering and protects them from potentially harmful environmental conditions and occurrences. Since the folder of the present invention is comprised of a resilient, flexible material, it is easily transportable. The trapezoidal configuration of the present invention allows for convenient and efficient storage.

Although the present invention has been described and illustrated with respect to a preferred embodiment thereof, it is to be understood that it is not to be so limited since changes and modifications may be made therein which are within the full intended scope of this invention as hereinafter claimed.

What is claimed is:

1. A folder cut from a single piece of material comprising front and back panels, a spine disposed therebetween, a retaining flap, and a spine disposed between said retaining flap and said back panel; a plurality of straps formed integrally with said back panel, each strap being uniformly narrow in width and situated transversely to said spine between said back panel and said retaining flap and having a protuberance located closer to the root of said strap than to the end of said strap, that portion of the strap located between the end of said strap and said protuberance fashioning a tongue; said root of each strap situated uniformly adjacent to the fold line of the spine between said back panel and said retaining flap; said retaining flap having apertures centered on the width of said flap and correlatively spaced to said plurality of straps, said apertures sized slightly smaller than said protuberances of said straps to securely hold said protuberances; said front panel having widely slotted apertures correlatively spaced with said apertures in said retaining flap and said plurality of straps, said widely slotted apertures extending transversely from and communicating with the perpendicular edge of said front panel, and transverse slots adapted to accept said tongues of said plurality of straps in aligned relation to said widely slotted apertures.

2. A folder according to claim 1 composed of a resilient, flexible synthetic plastic material.

3. A folder according to claim 2 wherein the material is selected from the group consisting of polyethylene, polypropylene, and polyvinylchloride.

4. A folder according to claim 1 wherein there are two straps formed integrally with the back panel, a retaining flap having two apertures correlatively spaced with said straps, two widely slotted apertures in the front panel correlatively spaced with said straps and said apertures in said retaining flap, and two transverse slots in aligned relation with said widely slotted apertures.

5. A folder according to claim 1 wherein there are three or more straps formed integrally with the back panel, a retaining flap having a plurality of apertures correlatively spaced with said straps, a plurality of widely slotted apertures in the front panel correlatively spaced with said straps and said apertures in said retaining flap, and a plurality of transverse slots in aligned relation with said widely slotted apertures.

* * * * *